N. H. RAYMOND.
THREAD PROTECTOR FOR PIPES.
APPLICATION FILED MAY 26, 1915.

1,255,463.

Patented Feb. 5, 1918.

INVENTOR
Nelson H. Raymond
by Geyer & Pope
ATTORNEYS.

UNITED STATES PATENT OFFICE.

NELSON H. RAYMOND, OF BUFFALO, NEW YORK, ASSIGNOR TO CLIFTON MANUFACTURING CO., OF JAMAICA PLAIN, MASSACHUSETTS, A CORPORATION OF NEW JERSEY.

THREAD-PROTECTOR FOR PIPES.

1,255,463. Specification of Letters Patent. Patented Feb. 5, 1918.

Application filed May 26, 1915. Serial No. 30,537.

*To all whom it may concern:*

Be it known that I, NELSON H. RAYMOND, a citizen of the United States, residing at Buffalo, in the county of Erie and State of New York, have invented new and useful Improvements in Thread - Protectors for Pipes, of which the following is a specification.

This invention relates to means for protecting the threads of electric wire conduits or pipes so as to prevent these threads from becoming filled or coated with enamel and also prevent the same from becoming burred while shipping or handling the same.

It is the object of this invention to provide simple, inexpensive and efficient means whereby the above mentioned purpose is accomplished.

Figure 1:
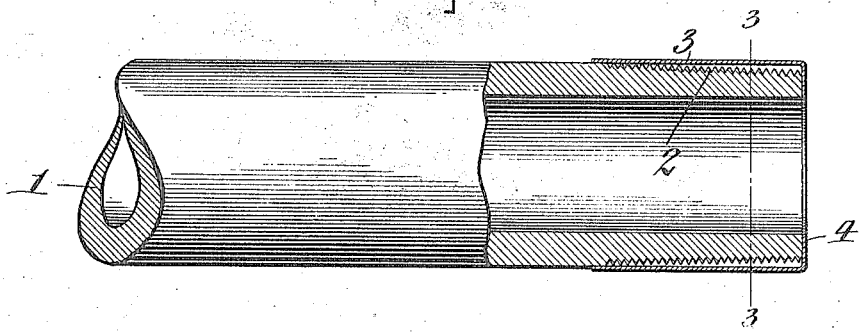
Figure 2:
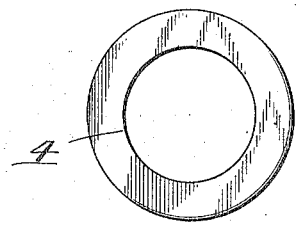
Figure 3:
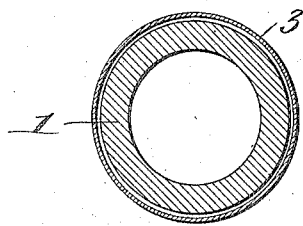

In the accompanying drawings:

Figure 1 represents a longitudinal section of an electric conduit or pipe having its threads protected by the preferred form of my invention. Fig. 2 is an end elevation of the same. Fig. 3 is a cross section thereof taken in line 3—3, Fig. 1.

Similar characters of reference indicate corresponding parts throughout the several views.

1 represents an electric conduit or pipe which is usually constructed of iron and provided on the end of its periphery with external screw threads 2 for use in connecting the same by a coupling sleeve with another pipe of the same character when installing the same in the building preparatory to wiring the same for electricity.

These pipes are usually covered on the inner and outer sides thereof with a coating of enamel for the purpose of protecting the pipes against rusting and also to serve as an electrical insulation. When dipping these pipes in enamel the external coupling threads thereof also become filled, coated or covered with enamel which usually necessitates re-cutting the threads by a suitable tool in order to clean off the enamel before the pipes can be assembled and installed in a building.

Furthermore, when these pipes are shipped or handled after the threads are thus cut on the same the latter are liable to become burred or injured which necessitates running a tool over the same in order to put the threads in condition for coupling the pipes properly.

To prevent the threads of the pipes or at least a considerable part of those adjacent to the ends of the pipes from being coated with enamel while the pipes are being dipped in this material, a protecting device is provided which is preferably constructed in the form of a ferrule or cap and comprises a tubular body 3 which surrounds the end portion of a pipe so as to cover all or most of the threads, and an inwardly projecting annular flange 4 arranged at the outer end of this tubular body and engaging with the adjacent end of the pipe. This protecting ferrule is preferably constructed of a very thin metal such as sheet brass and the tubular body is made of such diameter that when applied to the end of a pipe the same will engage frictionally therewith and be held against displacement thereon while this pipe is being manipulated when dipped in enamel or handled during transportation.

When the pipe having its thread and end covered with the sleeve and flange is dipped into the enamel the latter will form a protecting coating on the exposed surfaces of the pipe, sleeve and flange but the threads will not be covered with enamel.

When a ferrule is thus applied to the threaded portion of a pipe these threads will remain unenamaled as the pipe is dipped in an enamel bath for coating the same, whereby the peripheral covering or coating of enamel on the pipe is confined to the unthreaded portion of the outer side of the pipe. If a few of the innermost threads become coated with enamel by reason of the ferrule being somewhat short it is not particularly objectionable it being sufficient for all practical purposes so long as the ferrule covers the threads from the front or outer end of the pipe inwardly for a considerable portion of these threads.

When this pipe is being shipped from the factory to the place where it is to be installed the threads, particularly those near the end of the pipe, are protected against burring or injury. Preparatory to assembling this pipe with others and installing the same in a building the protecting ferrule may be easily removed by means of a knife, screw driver or similar instrument. When thus uncovered the thread will be found free from enamel and also in an uninjured condition, so that no re-cutting or cleaning of the threads is necessary in order to put the same in condition for use.

This means of protecting the threads of electric conduits or pipes permits the installation of the same to be effected more expeditiously and conveniently and also at reduced cost on account of the saving in time which otherwise would be spent in cleaning and re-cutting the threads preparatory to installation.

I claim as my invention:

A new article of manufacture comprising a pipe having an external tapering thread at its end, an unthreaded seamless sleeve fitting frictionally upon the exterior of the pipe and covering the threads and the adjacent unthreaded part thereof and provided with an integral inwardly projecting annular flange engaging with the end of the pipe, and a protecting coating applied to the exposed surfaces of said conduit and said sleeve and flanges.

NELSON H. RAYMOND.